United States Patent [19]

Howell, Jr. et al.

[11] Patent Number: 4,521,036
[45] Date of Patent: Jun. 4, 1985

[54] SPRINKLER HEAD SUPPORT

[76] Inventors: William T. Howell, Jr., Rte. 6, Box 39; John T. Howell, Rte. 4, Box 398A; Danny T. Howell, Rte. 4, Box 398, all of Eastman, Ga. 31023

[21] Appl. No.: 342,823

[22] Filed: Jan. 26, 1982

[51] Int. Cl.³ .............................................. F16L 3/00
[52] U.S. Cl. ........................................ 285/61; 248/76; 248/167; 248/524
[58] Field of Search ...................... 285/61; 248/80, 83, 248/158, 167, 170, 188.7, 519, 520, 523, 524, 529

[56] References Cited

U.S. PATENT DOCUMENTS

| | | |
|---|---|---|
| 542,029 | 7/1895 | Rigby ..................................... 248/80 |
| 807,184 | 12/1905 | Malnburg . |
| 1,368,416 | 2/1921 | Thomas . |
| 1,444,900 | 2/1923 | Blaw . |
| 1,634,261 | 7/1927 | Knauff . |
| 1,849,303 | 3/1932 | Labaw ..................................... 248/170 |
| 1,959,886 | 5/1934 | Wadsworth . |
| 2,242,840 | 5/1941 | Warden ..................................... 248/83 |
| 2,652,218 | 9/1953 | Dean . |
| 2,694,600 | 11/1954 | Richey ..................................... 285/61 |
| 2,792,257 | 5/1957 | Davis ..................................... 248/83 X |
| 2,795,459 | 6/1957 | Cornelius . |
| 2,845,243 | 7/1958 | Mowers et al. ................. 248/170 X |
| 3,066,958 | 12/1962 | Bergin et al. ........................ 285/61 |
| 3,218,073 | 11/1965 | Frost ................................. 248/524 X |
| 3,295,802 | 1/1967 | Leatherman ..................... 248/529 X |
| 3,787,018 | 1/1974 | Nathan ............................ 248/529 X |
| 3,815,859 | 6/1974 | Leopold ............................. 285/61 X |
| 4,088,294 | 5/1978 | Aliment et al. ................. 248/529 X |
| 4,192,076 | 3/1980 | Hall ................................. 248/524 X |
| 4,288,052 | 9/1981 | Scott ................................. 248/158 X |
| 4,429,846 | 2/1984 | Halvorson .......................... 248/524 |

FOREIGN PATENT DOCUMENTS 1175481 8/1964 Fed. Rep. of Germany ........ 248/80
479623 2/1938 United Kingdom ................ 248/167

Primary Examiner—William H. Schultz
Attorney, Agent, or Firm—Newton, Hopkins & Ormsby

[57] ABSTRACT

A knock-down low cost stable support structure for a lawn sprinkler head consists of a standpipe whose upper end is connected to the sprinkler head and whose lower end is connected to a garden hose, and a tripod stand supporting the standpipe. The stand includes separable legs secured by fasteners which also engage supporting brackets on the standpipe.

3 Claims, 10 Drawing Figures

SPRINKLER HEAD SUPPORT

BACKGROUND OF THE INVENTION

The objective of this invention is to provide an inexpensive, convenient and exceptionally stable support for a sprinkler head which can be marketed in a knockdown state as a packaged kit and easily set up by a purchaser for ready connection with a garden hose and a standard commercial sprinkler head.

The structure involves two main components, namely, a standpipe and a tripod stand which can be assembled for use by employing two nut and bolt fasteners to connect the standpipe with the stand. The device is extremely simple and very durable and it provides a wide stance stable support for the sprinkler head. It is also lightweight and enables packaging of the separated parts in a slender package to enhance marketing.

Other features and advantages of the invention will become apparent to those skilled in the art during the course of the following description.

DETAILED DESCRIPTION

Figure 1:
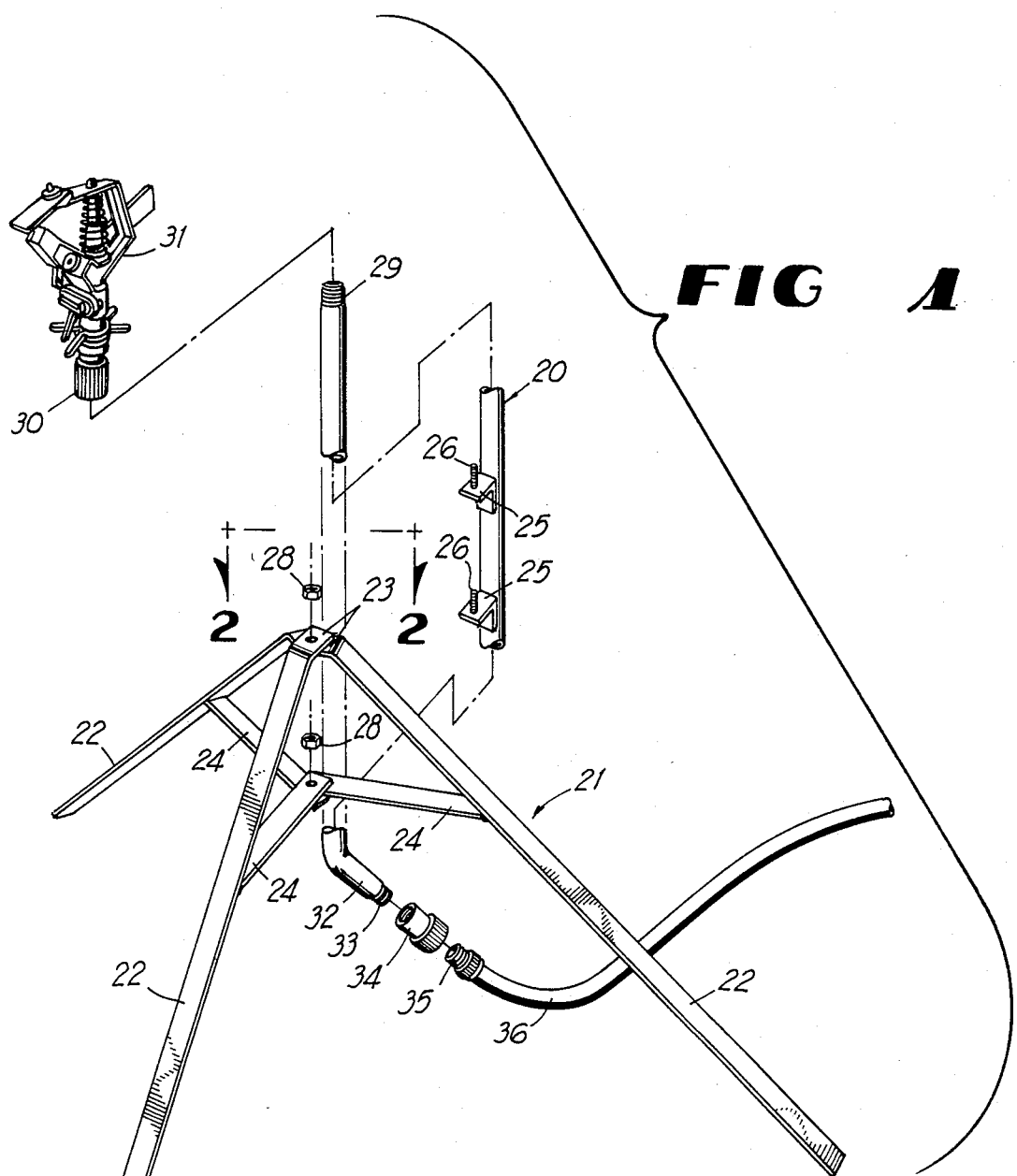
FIG. 1 is an exploded perspective view of a sprinkler head support in accordance with the invention.
Figure 2:
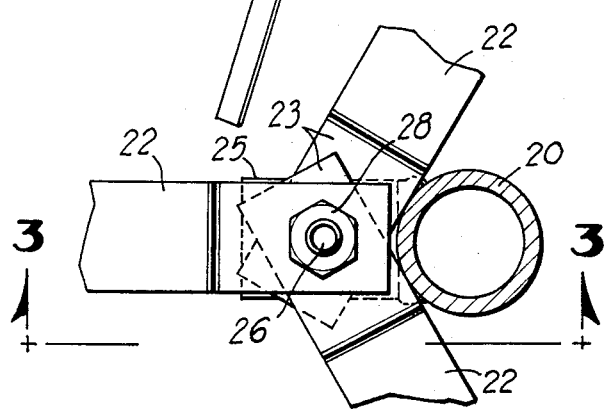
FIG. 2 is an enlarged fragmentary horizontal section taken on line 2—2 of FIG. 1.
Figure 3:
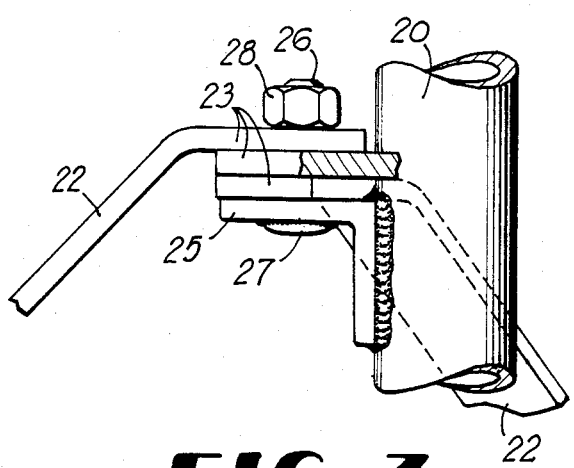
FIG. 3 is a vertical section taken on line 3—3 of FIG. 2.
Figure 4:
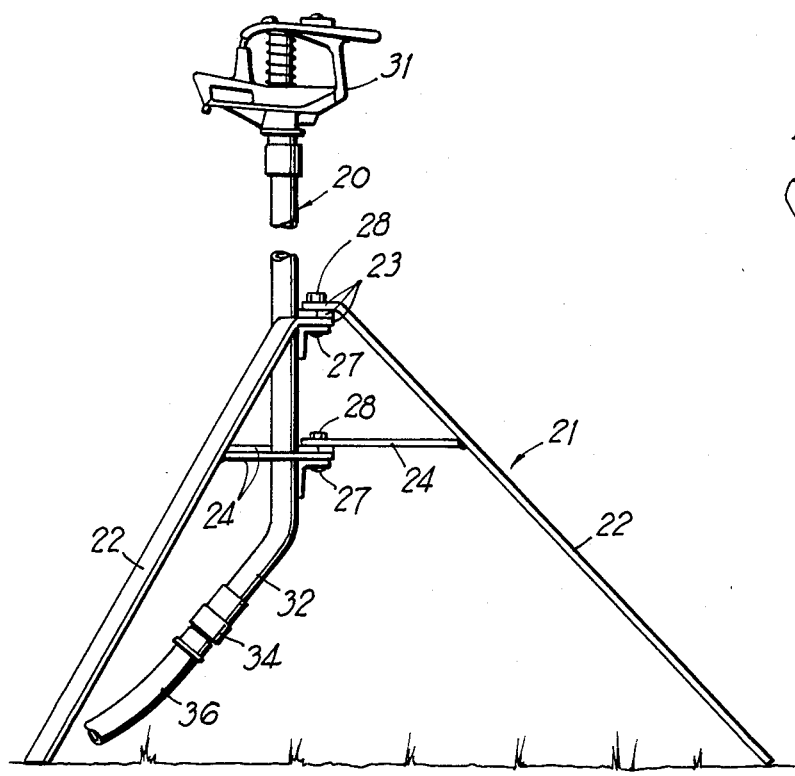
FIG. 4 is a side elevation of the support.

Referring to the drawings in detail wherein like numerals designate like parts, a sprinkler head support structure in accordance with the invention consists primarily of a standpipe 20 and a knock-down tripod stand 21 having three identical legs 22. At their upper ends, the legs 22, which are convergent in assembled relationship, have short angled tabs 23 which are centrally apertured. Somewhat below the apertured tabs 23, the legs 22 have struts 24 welded thereto, which struts are horizontally disposed, FIG. 4, when the support is assembled for use. The inner ends of the struts 24 are apertured as shown in the drawings and their apertures are coaxial with those of the tabs 23 when the support is assembled.

The standpipe 20 carries a pair of spaced mounting brackets 25, such as L-brackets, welded thereto in spaced aligned relationship, with the spacing of the two brackets 25 being such that they can engage directly beneath the tabs 23 and the apertured ends of the struts 24 when the device is assembled. The mounting brackets 25 are also apertured.

One pair of bolts 26 whose heads 27 may be fixed to the brackets 25 by welding project vertically above the brackets and engage through the registering apertures of the three tabs 23 and struts 24 in the simple assembly procedure. A pair of nuts 28 are applied to the tops of the bolts or studs 26 to secure the assembly. The vertical standpipe 20 is then securely fixed to the tripod stand 21 in slightly offset relationship to the common vertical axis of bolts 26, the standpipe extending well above the top of the stand and well below the struts 24.

An upper threaded terminal 29 of the standpipe receives a threaded sleeve 30 of a standard commercial lawn sprinkler head 31 to support the latter in a very stable manner. A lower angled extension 32 of the standpipe has a threaded terminal 33 receiving a threaded coupling 34 which also receives a male threaded fitting 35 of a common garden hose 36, the angled extension 32 rendering it unnecessary to bend the hose too abruptly.

The device is very convenient to erect and disassemble by the consumer and can be packaged and stored in a highly compact state, as previously noted. Inexpensive flat metal stock is employed in the tripod stand 21, as illustrated.

Figure 5:
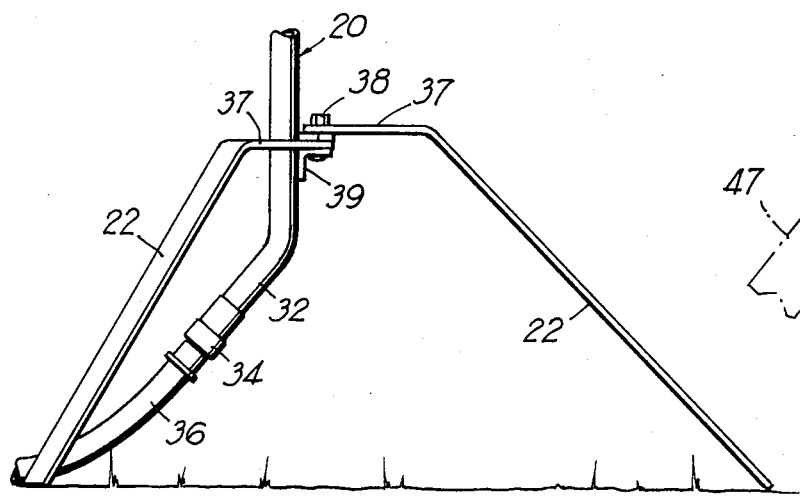
FIG. 5 is a fragmentary side elevation showing an alternate embodiment of the invention.

FIG. 5 of the drawings shows an alternate embodiment of the invention wherein the struts 24 of the tripod stand have been eliminated. The tabs or extensions 23 have been lengthened as at 37 and are apertured to receive a single bolt and nut 38, such bolt also engaging a single apertured bracket 39 on the standpipe 20. The remainder of the structure is identical to that of the previous embodiment shown in FIGS. 1-4.

Figure 6:
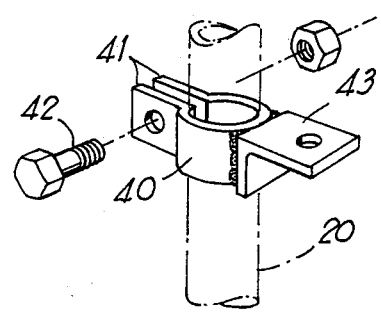
FIG. 6 is a partly exploded perspective view showing a variant of the standpipe support bracket means.

FIG. 6 shows an alternate form of support bracket for the standpipe 20 rendering it readily adjustable vertically relative to the tripod stand, not shown. The support bracket consists of a split ring 40 embracing the standpipe 20 and having spaced apertured ears 41 receiving therethrough a clamping bolt 42. An apertured L-bracket 43 is welded to the side of the split ring 40 away from the ears 41 and corresponds to one of the brackets 25 in the initial embodiment.

Figure 7:
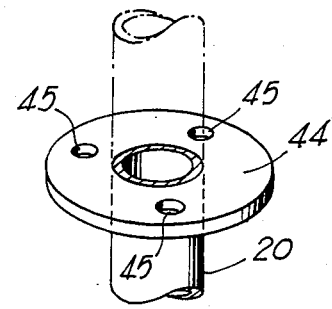
FIG. 7 is a similar view showing another variant of the standpoint supporting means.

FIG. 7 shows another variant of the supporting means for standpipe 20, wherein a disc 44 welded to the standpipe has three equidistantly spaced apertures 45 for the attachment of the legs of the stand, not shown. With the arrangement of FIG. 7, the vertical standpipe 20 is exactly centered on the tripod stand instead of slightly off-center as in the embodiments of FIGS. 1 through 5.

Figure 8:
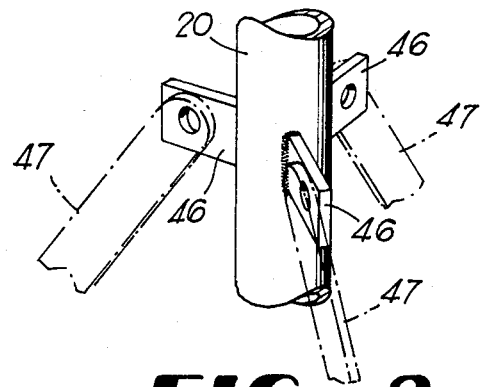
FIG. 8 is a similar view showing still another variant of the standpipe supporting means.

FIG. 8 shows still another variant of the standpipe support means in the form of three equidistantly spaced vertical apertured lugs 46 welded to the standpipe 20 and extending radially thereof, the three legs of a tripod stand being indicated at 47 in phantom lines. In this arrangement, the upper terminals of the legs 47 are disposed in vertical planes with the lugs 46 rather than horizontally as in the prior embodiments. The three legs may be twisted in their manufacture to accommodate this construction.

Figure 9:
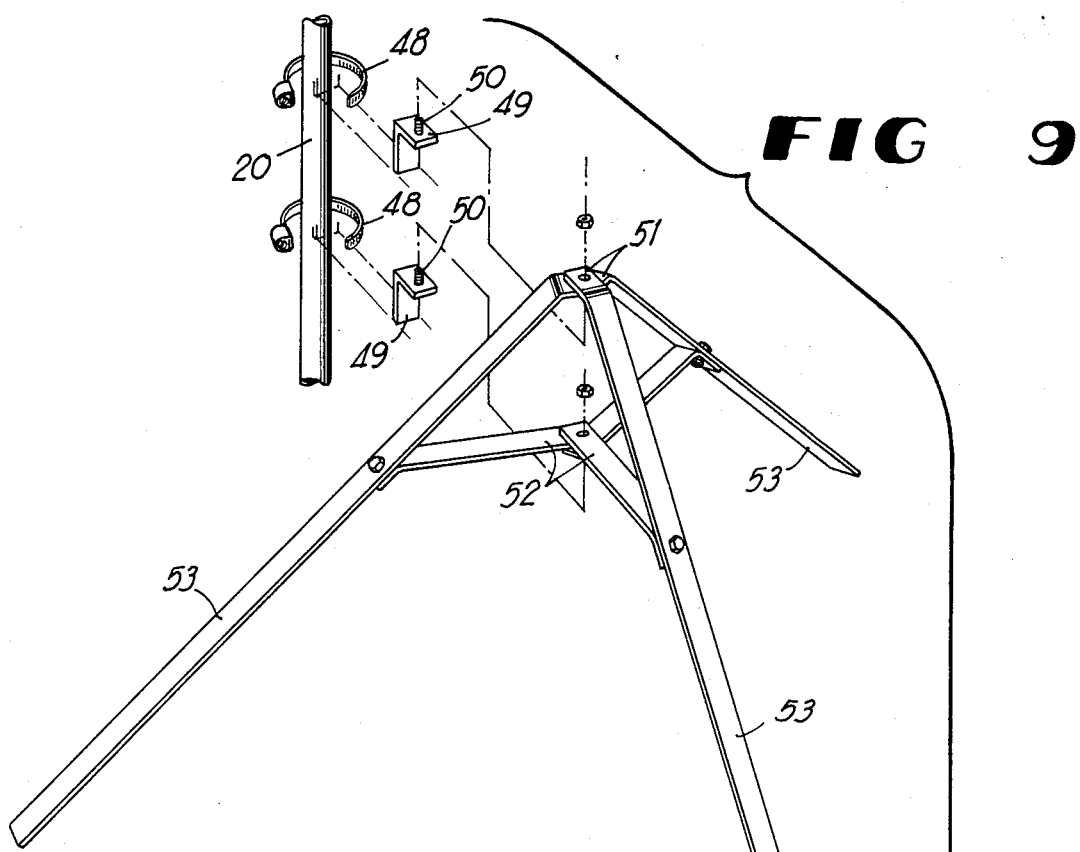
FIG. 9 is a partly exploded perspective view showing an alternate embodiment of the standpipe and sprinkler head support.

FIG. 9 illustrates a further embodiment wherein the standpipe 20 is equipped with radiator hose clamps 48 for securing the mounting brackets 49 to the standpipe in lieu of welding. When mounted on the standpipe 20 in this manner, the brackets 49 through their bolts or studs 50 are connected with the tabs 51 and struts 52 of the tripod legs 53 in the manner described for the embodiment shown in FIG. 1. Not only is welding eliminated, but the standpipe 20 is easily adjusted vertically on the tripod stand so that sprinkler head height can be regulated. The arrangement differs from that of FIG. 1 in that the purchaser mounts the two brackets 49 on the standpipe rather than the manufactuer.

Figure 10:
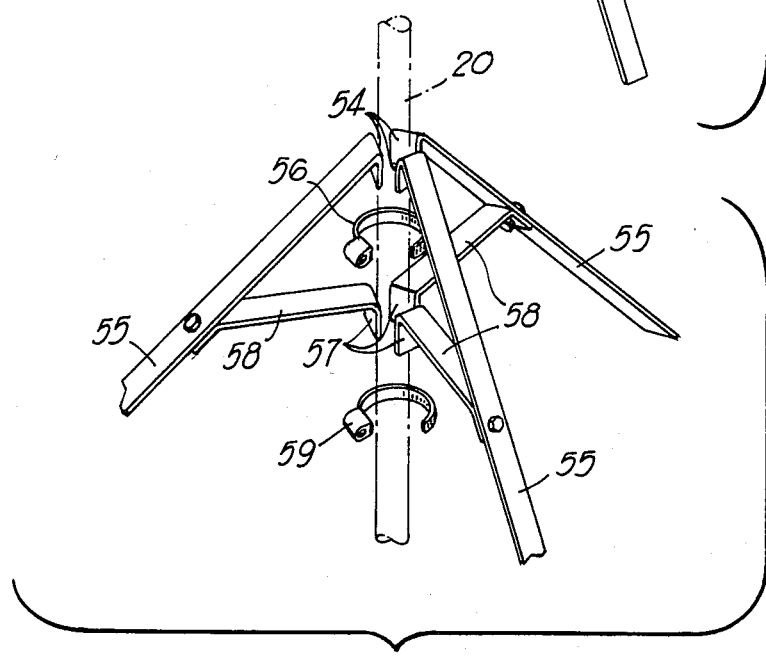
FIG. 10 is a perspective view of a final embodiment of the standpipe and sprinkler head support.

FIG. 10 shows another modification in which the mounting brackets 49 are eliminated entirely. Instead, the upper terminals 54 of legs 55 are turned downwardly to surround the standpipe 20 and are attached adjustably thereto by hose clamp 56. Similarly, downturned terminals 57 of struts 58 are secured by another hose clamp 59. The arrangement not only eliminates a need for welding in the manufacturing of the device, but also does away with the drilling of holes for attaching the tripod legs to the standpipe as in all of the prior embodiments.

It is to be understood that the forms of the invention herewith shown and described are to be taken as preferred examples of the same, and that various changes in the shape, size, and arrangement of parts are resorted to, without departing from the spirit of the invention or scope of the subjoined claims.

I claim:

1. A knock-down sprinkler head support comprising a standpipe having screw-threaded end portions, spaced aligned apertured mounting brackets fixed on the standpipe and projecting from one side thereof with their apertures in coaxial relationship, a tripod support for the standpipe including inclined circumferentially spaced separately formed legs, the legs having upper end apertured tabs resting in coaxial stacked relationship on one of said standpipe mounting brackets and the legs having struts fixed thereto below said tabs and being apertured and resting on the other standpipe mounting bracket in stacked relationship, the apertures of said tabs and struts being coaxially aligned and in registration with the apertures of the standpipe mounting brackets, and a single pair of separable fasteners engaged with the apertures of said tabs and struts and the apertures of the standpipe mounting brackets beneath the tabs and struts.

2. A knock-down sprinkler head support as defined in claim 1, and said separable fasteners comprising a pair of vertical axis bolt and nut fasteners.

3. A knock-down sprinkler head support comprising a standpipe adapted for coupling at one end to a sprinkler head and at its other end to a garden hose, a support structure for the standpipe comprising at least three circumferentially spaced legs having apertured terminals at corresponding ends thereof, coacting apertured support bracket means on the standpipe between the ends of the standpipe, separable fastener means joining the support bracket means of the standpipe with said apertured terminals of the legs, said coacting apertured support bracket means on the standpipe comprising a pair of spaced aligned apertured bracket elements fixed on the standpipe, struts fixed on said legs and projecting inwardly thereof and having apertured inner ends which register and are coaxially aligned in assembly with the apertured bracket elements on the standpipe, and the separable fastener means comprising a pair of separable fasteners engaging through the apertures of the bracket elements and struts.

* * * * *